UNITED STATES PATENT OFFICE.

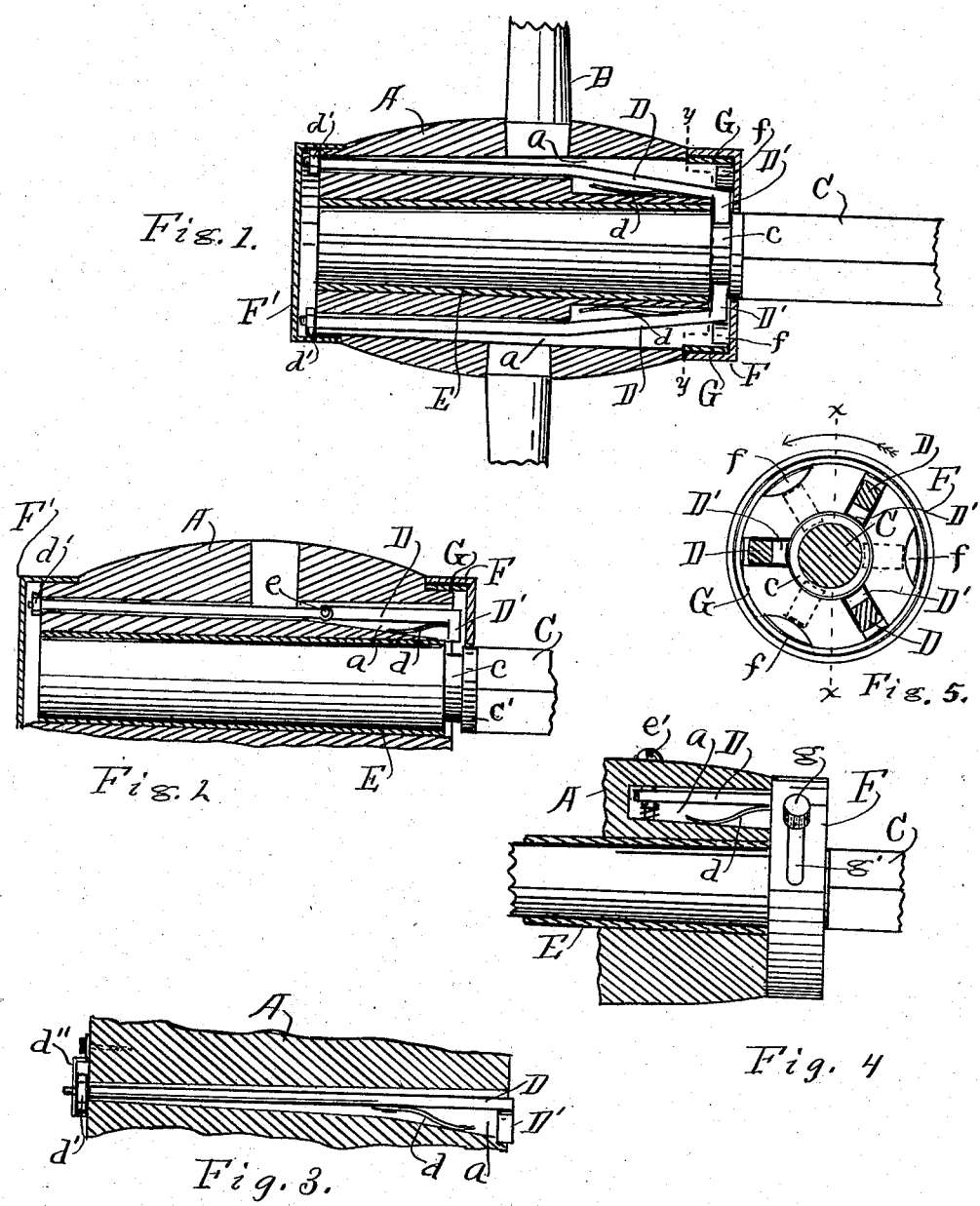

WARREN H. GIBSON, OF GRAND RAPIDS, MICHIGAN.

WHEEL-LOCK.

No. 885,036.  Specification of Letters Patent.  Patented April 21, 1908.

Application filed April 29, 1907. Serial No. 371,014.

*To all whom it may concern:*

Be it known that I, WARREN H. GIBSON, a citizen of the United States, residing at Grand Rapids, in the county of Kent and State of Michigan, have invented certain new and useful Improvements in Wheel-Locks, of which the following is a specification.

My invention relates to improvements in appliances for securing vehicle wheels to the axletree, and its objects are: First, to dispense with the use of nuts for securing the wheel on the axletree. Second, to provide a means whereby the wheel may be readily secured to or removed from the axletree without the necessity of first removing the sand guard from the hub of the wheel. Third, to provide a means whereby the wheel may be readily secured to or removed from the axletree, and at the same time to so secure the wheel that there will be no danger of its becoming accidentally disconnected therefrom, and, fourth, to so secure the wheel to the axletree that a sand guard will be provided at both ends of the wheel hub. I attain these objects by the mechanism illustrated in the accompanying drawing in which Figure 1 is a vertical section of the hub on the line *x x* of Fig. 5, and the axletree in place with my securing appliance engaging it. Fig. 2 is the same showing a modified form of securing appliance having a hinged or pivoted joint near one end. Fig. 3 is the same showing a straight solid arm upon the securing device. Fig. 4 shows a short arm upon the securing device, secured in place by means of a screw placed laterally into the hub and through the end of the arm, and Fig. 5 is an elevation of the reverse side of the sand guard and actuating collar at the inner end of the hub, and of the securing arms and the axletree cut off approximately upon the line *y y* of Fig. 1.

Similar letters refer to similar parts throughout the several views.

A represents the wheel hub, B a portion of a spoke and C is the axletree which has a groove *c* around it at the inner end of the wheel hub. My appliance consists, first, of a latch D, of any convenient or available form and having a lip D′ projecting at right angles therewith in position to be made to engage the groove *c* in the axletree, as indicated in Figs. 1 and 2, in such a manner that while the wheel may revolve freely upon the axletree it will be held securely against endwise motion. In its normal position this arm is held out of contact with the groove *c* by means of the spring *d*, and to throw and hold it in contact with the axletree in said groove I place a metallic ferrule G around the end of the hub A and over this I place a sand guard F which has curved bearings *f* integral with its end surface in position so that if the guard is in the position indicated in Fig. 1 they will engage the backs of the lips D′ and force them down into the groove *c*, as indicated, but if the guard is turned around, as indicated in Fig. 5 the spring *d* will throw the arm D back so that the lip D′ will be drawn entirely out of the groove *c* and the hub may be readily removed from the axletree C.

The latch D may be made with a long integral arm, as indicated in Figs. 1 and 3, terminating with a nut *d'* arranged to hold it to place so that the lip D′ will properly engage the axletree in the groove *c*, or it may be made with a pivotal joint, as at *e* in Fig. 2, in which case the portion having the nut *d'* upon it is immovable in the hub, the entire motion of the arm being in the portion having the lip D′ upon it, and in some instances I have used a short arm, as indicated in Fig. 4, placed in a short mortise in the end of the hub A and secured in place by means of a screw *e'* passing into the hub and through a hole in the end of the arm D, as indicated. I mention these several forms as indicating the diversity of forms that may be used, indicating that it is not the special form of latch, but the manner of applying it, that enters into the necessary elements of my invention.

Where the nut *d'* is used to secure the arm of the latch D it is necessary to provide some means of locking it in place so that it cannot become, accidentally, removed from the arm, and for this purpose it may be placed close enough to the rim of the sand guard F′ so that it cannot turn, as indicated in Fig. 2, or any available form of nut lock may be used, as indicated by the plate *d''* in Fig. 3.

It will be noticed, see Figs. 1 and 2, that the axletree C, passes from the right through the hub, and extends to a point where its end is just flush with the left hand end of the hub A so that the sand guard F′ may be secured permanently to the end of the hub and need never be removed unless it be to adjust the nut *d'*, thus forming a perfectly closed and secure dust guard at this end of the hub. At the other end of the hub I securely attach a ferrule G around the end of the hub and place the sand guard F over it with the end of the guard projecting inward far enough to form a close joint around the flange c' of the axletree C, thus forming a practical sand guard at this end of the hub.

To utilize the guard F for manipulating the latches D D' it must be made easily revoluble upon the ferrule G and, at the same time, it must be so arranged that it will not slip off the ferrule endwise, or become loose and turn thereon except by the direct act of the operator, and for this purpose it may be securely clamped to the ferrule by means of thumb screws, as g, or by any other of the well known mechanical appliances available for the purpose, and should be provided with a slot, as g', or some other available appliance to allow it to be revolved a short distance, as shown in Fig. 4 and indicated by the arrow in Fig. 5, it being understood that the thumb screw or thumb piece g may indicate the head of a screw designed to be screwed into the ferrule G or it may indicate a thumb piece on a spring catch arranged to operate in the slot g' and act upon the surface of the ferrule G, or as the manipulating element of any other available locking device for the guard F.

Having thus fully described my invention, what I claim as new and desire to secure by Letters Patent of the United States, is:—

1. In combination with a wheel hub, and an axletree having an annular groove around it near the inner end of the hub, latches secured in the hub in position to engage the groove in the axletree, a ferrule around one end of the hub, a sand guard revolubly mounted over said ferrule, bearings inside said sand guard in position to be made to actuate the latches when the sand guard is revolved, and means for locking the sand guard in place on the ferrule.

2. In combination with a wheel hub, and an axletree having an annular groove in it near the end of the hub, latches secured in the hub, a ferrule around the end of the hub, a sand guard revolubly mounted on the ferrule, bearings in the sand guard in position to actuate the latches in one direction when the sand guard is revolved, means for locking the sand guard firmly in place, and springs on the latches for actuating them one way.

3. In combination with a wheel hub, and an axletree having an annular groove near the inner end of the hub, latches secured in the hub in position to engage the groove in the axletree, nuts securing said latches in place, at one end of the hub, and nut locks to prevent said nuts from turning off of the ends of the latches; a ferrule secured around the other end of the hub, a sand guard revolubly secured around the ferrule, bearings in the sand guard in position to actuate the latches to force them into the groove in the axletree, means for locking the sand guard securely to the ferrule, and springs for forcing the latches out of the groove in the axletree.

4. In combination with a wheel hub, and an axletree having an annular groove in its surface, an arm passing longitudinally through the hub, a nut securing said arm in place, a latch pivoted to one end of said arm in position to be made to enter the groove in the axletree, and means for forcing said latch into or out of said groove, substantially as and for the purpose set forth.

Signed at Grand Rapids Michigan April 24, 1907.

WARREN H. GIBSON.

In presence of—
  ITHIEL J. CILLEY,
  E. J. NOBLE.